(12) United States Patent
Cho et al.

(10) Patent No.: US 7,636,512 B2
(45) Date of Patent: *Dec. 22, 2009

(54) METHOD AND APPARATUS OF RECORDING A MULTI-CHANNEL STREAM, AND A RECORDING MEDIUM CONTAINING A MULTI-CHANNEL STREAM RECORDED BY SAID METHOD

(75) Inventors: Jang Hui Cho, Seoul (KR); Jea Yong Yoo, Seoul (KR); Kang Soo Seo, Kyunggi-do (KR); Byung Jin Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 871 days.

This patent is subject to a terminal disclaimer.

(21) Appl. No.: 10/176,367

(22) Filed: Jun. 20, 2002

(65) Prior Publication Data

US 2002/0197059 A1    Dec. 26, 2002

(30) Foreign Application Priority Data

Jun. 21, 2001    (KR) ............................... 2001-35399

(51) Int. Cl.
    *H04N 7/52* (2006.01)
(52) U.S. Cl. ............................ 386/95; 386/36; 386/37; 386/92; 386/124; 386/125; 386/126
(58) Field of Classification Search ............. 386/95–96, 386/124–126, 36–37, 92
    See application file for complete search history.

(56) References Cited

U.S. PATENT DOCUMENTS 5,521,898 A    5/1996    Ogasawara (Continued)

FOREIGN PATENT DOCUMENTS

CN    1134583    10/1996

(Continued)

OTHER PUBLICATIONS

Chinese Office Action dated Dec. 14, 2007.

(Continued)

*Primary Examiner*—Thai Tran
*Assistant Examiner*—Helen Shibru
(74) *Attorney, Agent, or Firm*—Harness, Dickey & Pierce, PLC

(57) ABSTRACT

The present invention relates to method and apparatus of recording a multi-channel data stream on a recording medium in such a manner that substreams of digital channels constituting the multi-channel data stream can be distinguished each other in reproduction. The present recording method records a multi-channel stream composed of substreams belonging to plural selected channels in a single stream object while grouping every partial stream of same channel to a data block and interleaving the data blocks of different channels each other, creates a piece of search information for each substream contained in the recorded multi-channel stream, and records the created plural pieces of search information on the recording medium. The present method makes it possible to selectively search and reproduce each substream among a multi-channel stream recorded on a recording medium, thereby improving use convenience of a recording machine such as a digital video recorder.

24 Claims, 12 Drawing Sheets

U.S. PATENT DOCUMENTS

| | | | |
|---|---|---|---|
| 5,559,808 A | 9/1996 | Kostreski et al. | |
| 5,602,956 A | 2/1997 | Suzuki et al. | |
| 5,651,010 A | 7/1997 | Kostreski et al. | |
| 5,729,549 A | 3/1998 | Kostreski et al. | |
| 5,732,185 A | 3/1998 | Hirayama et al. | |
| 5,742,569 A | 4/1998 | Yamamoto et al. | |
| 5,747,136 A | 5/1998 | Shono et al. | |
| 5,771,334 A | 6/1998 | Yamauchi et al. | |
| 5,784,528 A | 7/1998 | Yamane et al. | |
| 5,819,003 A | 10/1998 | Hirayama et al. | |
| 5,835,493 A | 11/1998 | Magee et al. | |
| 5,854,873 A | 12/1998 | Mori et al. | |
| 5,870,523 A | 2/1999 | Kikuchi et al. | |
| 5,877,817 A | 3/1999 | Moon | |
| 5,884,004 A | 3/1999 | Sato et al. | |
| 5,909,257 A | 6/1999 | Ohishi et al. | |
| 5,913,010 A | 6/1999 | Kaneshige et al. | |
| 5,940,255 A | 8/1999 | Uwabo et al. | |
| 5,949,792 A | 9/1999 | Yasuda et al. | |
| 5,953,187 A | 9/1999 | Uwabo et al. | |
| 5,966,352 A | 10/1999 | Sawabe et al. | |
| 5,987,126 A | 11/1999 | Okuyama et al. | |
| 5,999,698 A | 12/1999 | Nakai et al. | |
| 6,031,962 A | 2/2000 | Sawabe et al. | |
| 6,035,095 A | 3/2000 | Kaneshige et al. | |
| 6,064,796 A | 5/2000 | Nakamura et al. | |
| 6,067,400 A | 5/2000 | Saeki et al. | |
| 6,167,189 A | 12/2000 | Taira et al. | |
| 6,181,870 B1 | 1/2001 | Okada et al. | |
| 6,181,872 B1 * | 1/2001 | Yamane et al. | 386/112 |
| 6,185,365 B1 * | 2/2001 | Murase et al. | 386/95 |
| 6,195,726 B1 * | 2/2001 | Hogan | 711/112 |
| 6,219,488 B1 | 4/2001 | Mori et al. | |
| 6,222,805 B1 | 4/2001 | Mori et al. | |
| 6,285,825 B1 | 9/2001 | Miwa et al. | |
| 6,321,027 B2 | 11/2001 | Honjo | |
| 6,336,002 B1 | 1/2002 | Yamauchi et al. | |
| 6,343,062 B1 | 1/2002 | Furukawa et al. | |
| 6,351,442 B1 | 2/2002 | Tagawa et al. | |
| 6,353,613 B1 | 3/2002 | Kubota et al. | |
| 6,360,055 B1 | 3/2002 | Kaneshige et al. | |
| 6,377,747 B1 | 4/2002 | Murase et al. | |
| 6,385,388 B1 | 5/2002 | Lewis et al. | |
| 6,385,389 B1 | 5/2002 | Maruyama et al. | |
| 6,385,394 B1 | 5/2002 | Okada | |
| 6,385,398 B1 | 5/2002 | Matsumoto | |
| 6,393,574 B1 | 5/2002 | Kashiwagi et al. | |
| 6,415,101 B1 | 7/2002 | DeCarmo et al. | |
| 6,424,797 B1 | 7/2002 | Murase et al. | |
| 6,445,872 B1 | 9/2002 | Sano et al. | |
| 6,470,140 B1 | 10/2002 | Sugimoto et al. | |
| 6,470,460 B1 | 10/2002 | Kashiwagi et al. | |
| 6,504,996 B1 | 1/2003 | Na et al. | |
| 6,515,101 B1 | 2/2003 | Sheares | |
| 6,546,195 B2 | 4/2003 | Kashiwagi et al. | |
| 6,556,774 B2 | 4/2003 | Tsumagari et al. | |
| 6,564,006 B1 * | 5/2003 | Mori et al. | 386/95 |
| 6,567,608 B2 | 5/2003 | Mori et al. | |
| 6,573,819 B1 | 6/2003 | Oshima et al. | |
| 6,584,277 B2 | 6/2003 | Tsumagari et al. | |
| 6,603,517 B1 | 8/2003 | Shen et al. | |
| 6,618,396 B1 | 9/2003 | Kondo et al. | |
| 6,654,543 B2 | 11/2003 | Ando et al. | |
| 6,788,883 B1 | 9/2004 | Park et al. | |
| 6,801,713 B1 * | 10/2004 | Yagawa et al. | 386/69 |
| 6,818,170 B2 | 11/2004 | Yu et al. | |
| 6,901,078 B2 | 5/2005 | Morris | |
| 6,904,227 B1 | 6/2005 | Yamamoto et al. | |
| 7,024,102 B1 | 4/2006 | Inoshita et al. | |
| 7,072,573 B2 | 7/2006 | Okada et al. | |
| 7,106,946 B1 | 9/2006 | Kato | |
| 7,124,303 B2 | 10/2006 | Candelore et al. | |
| 7,236,687 B2 | 6/2007 | Kato et al. | |
| 7,245,825 B2 * | 7/2007 | Kikuchi et al. | 386/95 |
| 2001/0033517 A1 | 10/2001 | Ando et al. | |
| 2001/0038745 A1 * | 11/2001 | Sugimoto et al. | 386/95 |
| 2001/0043790 A1 * | 11/2001 | Saeki et al. | 386/65 |
| 2001/0053280 A1 | 12/2001 | Yamauchi et al. | |
| 2002/0015383 A1 | 2/2002 | Ueno | |
| 2002/0015581 A1 * | 2/2002 | Ando et al. | 386/95 |
| 2002/0021761 A1 | 2/2002 | Zhang et al. | |
| 2002/0031336 A1 | 3/2002 | Okada et al. | |
| 2002/0046328 A1 * | 4/2002 | Okada | 711/151 |
| 2002/0076201 A1 | 6/2002 | Tsumagari et al. | |
| 2002/0097981 A1 | 7/2002 | Seo et al. | |
| 2002/0097984 A1 | 7/2002 | Abecassis | |
| 2002/0106196 A1 | 8/2002 | Yamauchi et al. | |
| 2002/0127002 A1 | 9/2002 | Mori et al. | |
| 2002/0145702 A1 | 10/2002 | Kato et al. | |
| 2002/0159368 A1 | 10/2002 | Noda et al. | |
| 2002/0180803 A1 | 12/2002 | Kaplan et al. | |
| 2002/0196365 A1 * | 12/2002 | Cho et al. | 348/487 |
| 2002/0197059 A1 | 12/2002 | Cho et al. | |
| 2003/0002194 A1 | 1/2003 | Andoh | |
| 2003/0026597 A1 * | 2/2003 | Cho et al. | 386/111 |
| 2003/0118327 A1 | 6/2003 | Um et al. | |
| 2003/0123849 A1 | 7/2003 | Nallur et al. | |
| 2003/0133509 A1 | 7/2003 | Yanagihara et al. | |
| 2003/0161615 A1 | 8/2003 | Tsumagari et al. | |
| 2003/0221055 A1 | 11/2003 | Okada | |
| 2003/0235403 A1 | 12/2003 | Seo et al. | |
| 2003/0235404 A1 | 12/2003 | Seo et al. | |
| 2004/0086261 A1 | 5/2004 | Hanes | |
| 2004/0156621 A1 | 8/2004 | Seo et al. | |
| 2004/0179819 A1 | 9/2004 | Cho et al. | |
| 2004/0179820 A1 | 9/2004 | Kashiwagi et al. | |
| 2004/0179827 A1 | 9/2004 | Cho et al. | |
| 2004/0247290 A1 | 12/2004 | Seo et al. | |
| 2004/0252975 A1 | 12/2004 | Cho et al. | |
| 2005/0025458 A1 | 2/2005 | Sasamoto et al. | |
| 2005/0025459 A1 | 2/2005 | Kato et al. | |
| 2005/0036763 A1 | 2/2005 | Kato et al. | |
| 2005/0180289 A1 | 8/2005 | Manabu et al. | |
| 2005/0232111 A1 * | 10/2005 | Sawabe et al. | 369/59.25 |
| 2006/0062547 A1 | 3/2006 | Hamada | |
| 2006/0222340 A1 * | 10/2006 | Yamauchi et al. | 386/95 |
| 2007/0031122 A1 * | 2/2007 | Yamagata et al. | 386/95 |

FOREIGN PATENT DOCUMENTS

| | | |
|---|---|---|
| CN | 1150293 | 5/1997 |
| CN | 1197573 | 10/1998 |
| CN | 1220458 | 6/1999 |
| CN | 1237852 | 12/1999 |
| CN | 1251461 | 4/2000 |
| EP | 0723216 | 7/1996 |
| EP | 0737980 | 10/1996 |
| EP | 0836183 | 4/1998 |
| EP | 0836189 | 4/1998 |
| EP | 0847198 | 6/1998 |
| EP | 0873022 | 10/1998 |
| EP | 0896337 | 2/1999 |
| EP | 0917355 | 5/1999 |
| EP | 0918438 | 5/1999 |
| EP | 0920203 | 6/1999 |
| EP | 0940983 | 9/1999 |
| EP | 1 003 338 | 5/2000 |
| EP | 1 043 724 | 10/2000 |
| EP | 1081885 | 3/2001 |
| EP | 1126454 | 8/2001 |
| EP | 1198132 | 4/2002 |
| EP | 1198133 | 4/2002 |
| EP | 1202568 | 5/2002 |
| JP | 64-003781 | 1/1989 |

| | | |
|---|---|---|
| JP | 01-116819 | 5/1989 |
| JP | 08-088832 | 4/1996 |
| JP | 08-235833 | 9/1996 |
| JP | 09-023403 | 1/1997 |
| JP | 09-251759 | 9/1997 |
| JP | 10-032780 | 2/1998 |
| JP | 10-040667 | 2/1998 |
| JP | 10-51737 | 2/1998 |
| JP | 10-269698 | 10/1998 |
| JP | 10-271449 | 10/1998 |
| JP | 10-299698 | 11/1998 |
| JP | 11-041563 | 2/1999 |
| JP | 11-066813 | 3/1999 |
| JP | 11-103444 | 4/1999 |
| JP | 11-134812 | 5/1999 |
| JP | 11-185463 | 9/1999 |
| JP | 11-259976 | 9/1999 |
| JP | 11-2559976 | 9/1999 |
| JP | 11-346341 | 12/1999 |
| JP | 2000-030414 | 1/2000 |
| JP | 2000-041066 | 2/2000 |
| JP | 2000-069437 | 3/2000 |
| JP | 2000-113602 | 4/2000 |
| JP | 2000-149514 | 5/2000 |
| JP | 2000-235779 | 8/2000 |
| JP | 2000-293938 | 10/2000 |
| JP | 2000-299836 | 10/2000 |
| JP | 2000-348442 | 12/2000 |
| JP | 2001-24973 | 1/2001 |
| JP | 2001-024985 | 1/2001 |
| JP | 2001-111944 | 1/2001 |
| JP | 2001-067802 | 3/2001 |
| JP | 2001-111929 | 4/2001 |
| JP | 2001-111960 | 4/2001 |
| JP | 2001-169246 | 6/2001 |
| JP | 2001-297535 | 10/2001 |
| JP | 2002-083486 | 3/2002 |
| JP | 2002-112179 | 4/2002 |
| JP | 2002-150685 | 5/2002 |
| JP | 2002-158972 | 5/2002 |
| JP | 2002-158974 | 5/2002 |
| JP | 2002-176623 | 6/2002 |
| JP | 2002-216460 | 8/2002 |
| JP | 2002-222581 | 8/2002 |
| JP | 2003-087744 | 3/2003 |
| JP | 2003-116100 | 4/2003 |
| JP | 2006-503400 | 1/2006 |
| KR | 10-1999-0022858 | 10/1997 |
| KR | 1020000055028 A | 5/2000 |
| KR | 10-2000-0031861 | 6/2000 |
| KR | 1020000056179 A | 9/2000 |
| KR | 1020000065876 A | 11/2000 |
| KR | 10-2001-0022702 | 3/2001 |
| KR | 10-0294884 | 4/2001 |
| KR | 10-2001-0098007 | 11/2001 |
| KR | 10-2001-0098101 | 11/2001 |
| KR | 10-2001-0107578 | 12/2001 |
| KR | 10-2002-0006674 | 1/2002 |
| KR | 10-2002-0020919 | 3/2002 |
| KR | 10-2002-0097455 | 12/2002 |
| KR | 1020020097454 A | 12/2002 |
| KR | 10-2004-0000290 | 1/2004 |
| KR | 10-2004-0030992 | 4/2004 |
| KR | 10-2004-0030994 | 4/2004 |
| KR | 10-2004-0030995 | 4/2004 |
| KR | 10-2004-0041581 | 5/2004 |
| TW | 391548 | 5/2000 |
| WO | WO 97/06531 | 2/1997 |
| WO | WO 97/13364 | 4/1997 |
| WO | WO 97/13365 | 4/1997 |
| WO | WO 97/13366 | 4/1997 |
| WO | WO 98/00952 | 1/1998 |
| WO | WO 99/08281 | 2/1999 |
| WO | WO 99/34601 | 7/1999 |
| WO | WO 00/02195 | 1/2000 |
| WO | WO 00/05883 | 2/2000 |
| WO | WO 00/42515 | 7/2000 |
| WO | WO 00/62295 | 10/2000 |
| WO | WO 01/80239 | 10/2001 |
| WO | WO 01/82604 | 11/2001 |
| WO | WO 01/82606 | 11/2001 |
| WO | WO 01/82609 | 11/2001 |
| WO | WO 01/82610 | 11/2001 |
| WO | WO 2004/001748 | 12/2003 |
| WO | WO 2004/001750 | 12/2003 |
| WO | WO 2004/001753 | 12/2003 |
| WO | WO 2004/045206 | 5/2004 |
| WO | WO 2004/075181 | 9/2004 |
| WO | WO 2004-075183 | 9/2004 |
| WO | WO 2004/077417 | 9/2004 |
| WO | WO 2004/079736 | 9/2004 |
| WO | WO 2004/081939 | 9/2004 |
| WO | WO 2004/086371 | 10/2004 |

OTHER PUBLICATIONS

Japanese Office Action dated Jan. 22, 2008.
European Search Report dated Dec. 28, 2007.
European Search Report dated Jan. 2, 2008.
United States Office Action dated Jan. 2, 2008.
United States Office Action dated Jan. 28, 2008.
European Search Report dated Aug. 13, 2008.
Japanese Office Action dated Apr. 22, 2008.
Japanese Office Action dated May 20, 2008.
Search Report for corresponding European Application No. 03761863.4 dated Mar. 31, 2008.
Office Action for corresponding Japanese Application No. 2004-517368 dated May 7, 2008.
Office Action for corresponding Japanese Application No. 2004-517390 dated May 7, 2008.

* cited by examiner

FIG. 4

*PGC Information # i ( PGCI # i)*

| PGC General Information (PGC_GI) |
|---|
| Program Information # 1 (PGI #1) |
| ⋮ |
| Program Information # k (PGI #k) |
| ⋮ |
| Program Information # n (PGI #n) |
| Cell Information Search Pointer #1 (CI_SRP #1) |
| ⋮ |
| Cell Information Search Pointer #n (CI_SRP #m) |
| Cell Information #1 (CI #1) |
| ⋮ |
| Cell Information #k (CI #k) |
| ⋮ |
| Cell Information #m (CI #m) |

| Reserved |
|---|
| PG_TY ( Program Type ) |
| C_Ns ( Number of Cells in this PG ) |
| PRM_TXTI ( Primary Text Information ) |
| REP_PI ( Representative Picture Information ) |
| THM_SRPN ( Thumbnail Search Pointer Number ) |
| IT_TXT_SRPN ( IT_TXT Search Pointer Number for this Play List ) |

| C_TY ( Cell Type ) |
|---|
| HOBI_SRPN ( HOBI Search Pointer Number ) |
| PTMAPN ( PTMAP Number ) |
| C_V_S_PTM ( start PTM of this Cell ) |
| C_V_E_PTM ( End PTM of this Cell ) |

FIG. 5

*Program Type*

| b7 | b6 | b5 b4 b3 | b2 b1 b0 |
|---|---|---|---|
| Protect | S/M | Channel_Ns | R_CH_N |

Protect ---------- 0b : This PG is not in protected state
                   1b : This PG is in protected state
S/M     ---------- 0b : This PG has single-channel stream
                   1b : This PG has multi-channel stream
Channel_Ns -------- Number of broadcast digital channels referred by this PG
R_CH_N ----------- broadcast RF channel number referred by this PG

FIG. 6

*Cell Type*

| b7 b6 | b5 b4 b3 | b2 b1 b0 |
|---|---|---|
| C_TY1 | Reserved | C_CH_N |

C_TY1 ------------ single/multiple channel

C_CH_N ----------- broadcast digital channel number referred by this Cell

METHOD AND APPARATUS OF RECORDING A MULTI-CHANNEL STREAM, AND A RECORDING MEDIUM CONTAINING A MULTI-CHANNEL STREAM RECORDED BY SAID METHOD

BACKGROUND OF THE INVENTION

1. Field of the Invention

The present invention relates to method and apparatus of recording a multi-channel data stream on a recording medium, e.g., a writable high-density digital versatile disk (abbreviated to 'HD-DVD' hereinafter) in such a manner that substreams of digital channels constituting the multi-channel data stream can be distinguished each other in reproduction.

The present invention further relates to a recording medium on which a multi-channel data stream is recorded in such a manner that substreams of digital channels constituting the multi-channel data stream can be distinguished each other in reproduction.

2. Description of the Related Art

Owing to technical improvement in the fields of video/audio data compression, digital modulation/demodulation, and so on, a digital television broadcast system broadcasting TV signals in the form of digital data stream is being standardized rapidly.

In the digital television broadcast system, audio/video (A/V) signals to be broadcasted are compressed according to the data compressing rule specified by MPEG 2 (Moving Picture Experts Group) and the compressed A/V data are broadcasted in the form of transport stream (TS), which is also defined in MPEG 2 standard, composed of successive 188-byte-long transport packets (TPs).

The digital TV broadcast system, which will be commercialized soon owing to technical improvement of A/V data compression and transmission, is able to support much higher-quality of video and audio than an analog TV system. Furthermore, it ensures data compatibility with a digital communication device, a digital storage device, etc.

In the meantime, a new device is being developed to prepare for commercialization of digital TV broadcast system. That is a digital recorder being able to receive TS of digital broadcast programs and to record it on a writable HD-DVD. Such a digital recorder will be widely used as the digital TV broadcast system is commercialized in earnest.

A single physical broadcast channel (called 'RF channel' in general) has about 6 MHz bandwidth which ensures 19.4 Mbps data rate. This data rate can carry a single HD-TV broadcast signal or about four SD-TV signals. Such a logical or virtual channel carrying one SD-TV signal in an RF channel is called 'digital channel'.

In other words, a single RF channel sometimes includes several digital channels, namely, sub-channels which carry mutually-different broadcast programs.

Therefore, a DVD recorder being developed may have to record two or more digital channels simultaneously at a user's request. However, if a DVD recorder records a plurality of digital channels and creates management information through the same manner as it does for a single digital channel, a DVD could not tell digital channels apart among a recorded stream of digital channels. Namely, a user could not select only one program, i.e., one digital channel to be reproduced among the recorded plurality of digital channels.

SUMMARY OF THE INVENTION

It is an object of the present invention to provide method and apparatus of recording a multi-channel stream on a recording medium in a manner that substreams in the multi-channel stream can be distinguished each other in reproduction mode by management information and/or by totally or partially area-separate recording.

A method of recording a multi-channel on a recording medium in accordance with the present invention is characterized in that it comprises the steps of: recording a multi-channel stream composed of substreams belonging to a plurality of channels in a single stream object while grouping every partial stream of same channel to a data block and interleaving the data blocks of different channels each other; and creating search information for each substream contained in the recorded multi-channel stream in the single stream object and recording the created search information on a recording medium.

An apparatus of recording a multi-channel on a recording medium in accordance with the present invention is characterized in that it comprises: a data receiver receiving at least one RF channel of a digital broadcast signal to output a multi-channel stream composed of substreams belonging to selected plural sub-channels; and a recording means recording the multi-channel stream in a single stream object while grouping every partial stream of same channel to a data block and interleaving the data blocks of different channels each other, creating search information for each substream contained in the recorded stream, and recording the created search information on the recording medium.

BRIEF DESCRIPTION OF THE DRAWINGS

The accompanying drawings, which are included to provide a further understanding of the present invention, illustrate the preferred embodiments of the invention, and together with the description, serve to explain the principles of the present invention, and wherein:

FIGS. 4 to 7 are illustrative structures of navigation data created when a multi-channel stream is recorded as shown in FIG. 3;

DETAILED DESCRIPTION OF THE PREFERRED EMBODIMENT

In order that the invention may be fully understood, a preferred embodiment thereof will now be described with reference to the accompanying drawings.

Figure 1:
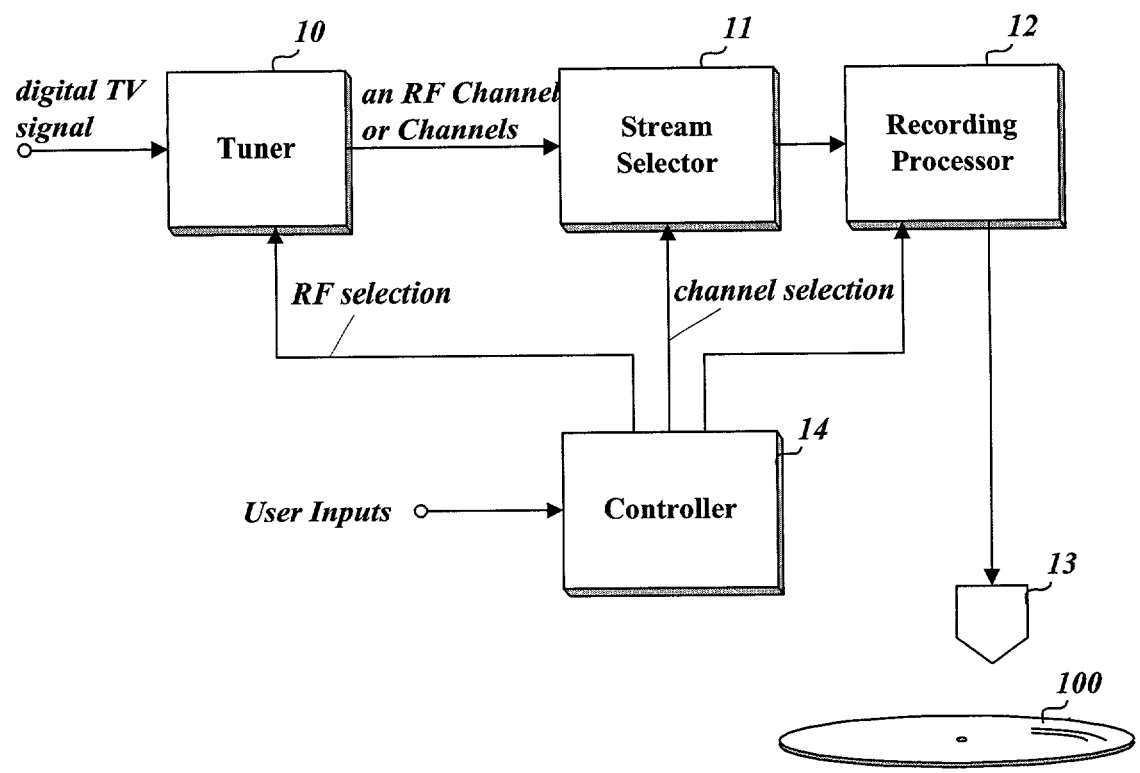
FIG. 1 is a block diagram of an apparatus recording a multi-channel stream in accordance with the present invention.

FIG. 1 is a block diagram of an apparatus recording a multi-channel stream in accordance with the present invention.

The apparatus of FIG. 1 may be a digital video recorder (DVR) being able to record a digital broadcast signal on a recording medium, e.g., a writable HD-DVD. The apparatus comprises a tuner 10 tuning its passband to at least one RF band of digital broadcast TV signal; a stream selector 11 selecting a plurality of substreams belonging to chosen digital channels (or sub-channels) from a data stream of an RF channel or channels passed by the tuner 10; a recording processor 12 recording the selected substreams in a single HOB (High-Density Stream Object) or HOBs according to a preset recording mode, creating and writing navigation data every a recorded substream; an optical pickup 13 forming mark/space patterns on a HD-DVD 100 in accordance with bit patterns of stream and navigation data outputted from the recording processor 12; and a controller 14 conducting overall control operations of all elements for multi-stream record.

Figure 2:
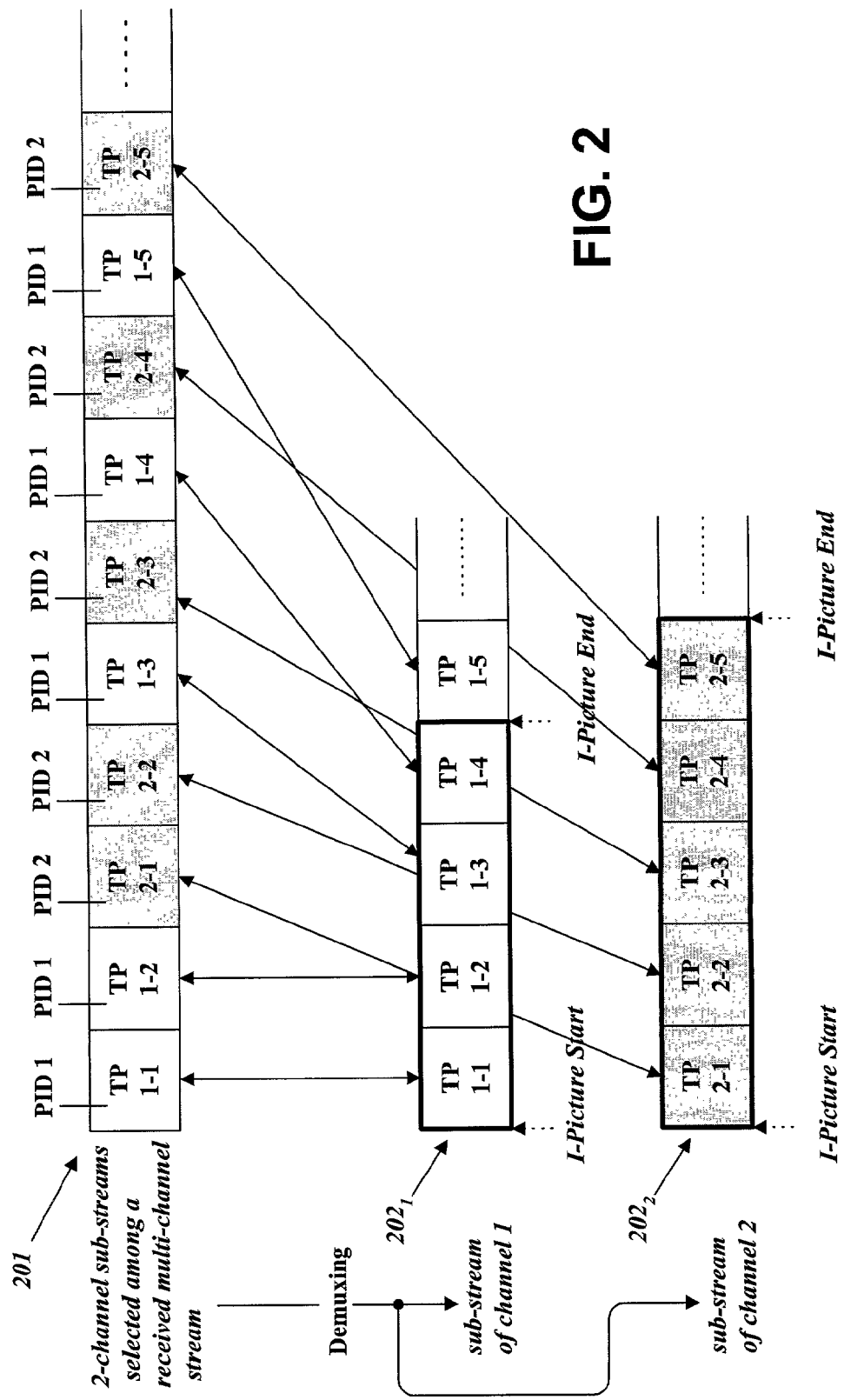
FIG. 2 illustrates a series of transport packets belonging to two sub-channels outputted in the form of single stream or mutually-separated streams.

The tuner 10 passes one digital broadcast TV channel, namely, an RF channel selected by the controller 14. The stream selector 11 extracts transport packets (TPs) belonging to several, e.g., 2 digital channels selected through the controller 14 from a multi-channel stream of the RF channel passed by the tuner 10. The extracted series of TPs by the stream selector 11 is outputted in the form of single stream 201 or mutually-separated streams $202_1$ and $202_2$, as illustrated in FIG. 2.

The tuner 10 can also pass multiple RF channels. In multiple passing mode, the stream selector 11 is also able to extract more than one substream from each RF channel to output a series of TPs belonging to digital channels chosen from available channels offered by respective RF channels.

For the convenience of explanation, it is supposed in all embodiments described in below that the stream selector 11 selects two substreams, namely, two digital channels from a received multi-channel stream.

The recording processor 12 can distinguish two digital-channel substreams, namely, the first and the second substream each other based on packet ID (PID) written in every TP outputted from the stream selector 11.

The first and the second digital-channel substream are recorded according to a preset recording mode. If the preset recording mode is 'mixed/grouping', the recording processor 12 records two multiplexed substreams from the stream selector 12 in a single allocated HOB 301 while grouping every some TPs for each substream and arranging grouped units of different channels sequentially, as shown in FIG. 3.

The TP-grouped unit interleaved one after another channel is a random accessible GOP (Group of Pictures) unit defined in MPEG standard or a data block of which size is equal to storage capacity of a HOB unit (HOBU) constituting a HOB. Since a GOP consists of full pictures only, pictures are not broken even if data is reproduced from its start point, therefore, every GOP ensures random accessibility.

In the meantime, the recording processor 12 creates navigation data for each digital-channel substream based on the distinguished digital-channel information and each substream recording information. The way how navigation data is created is described below in detail.

Figure 3:
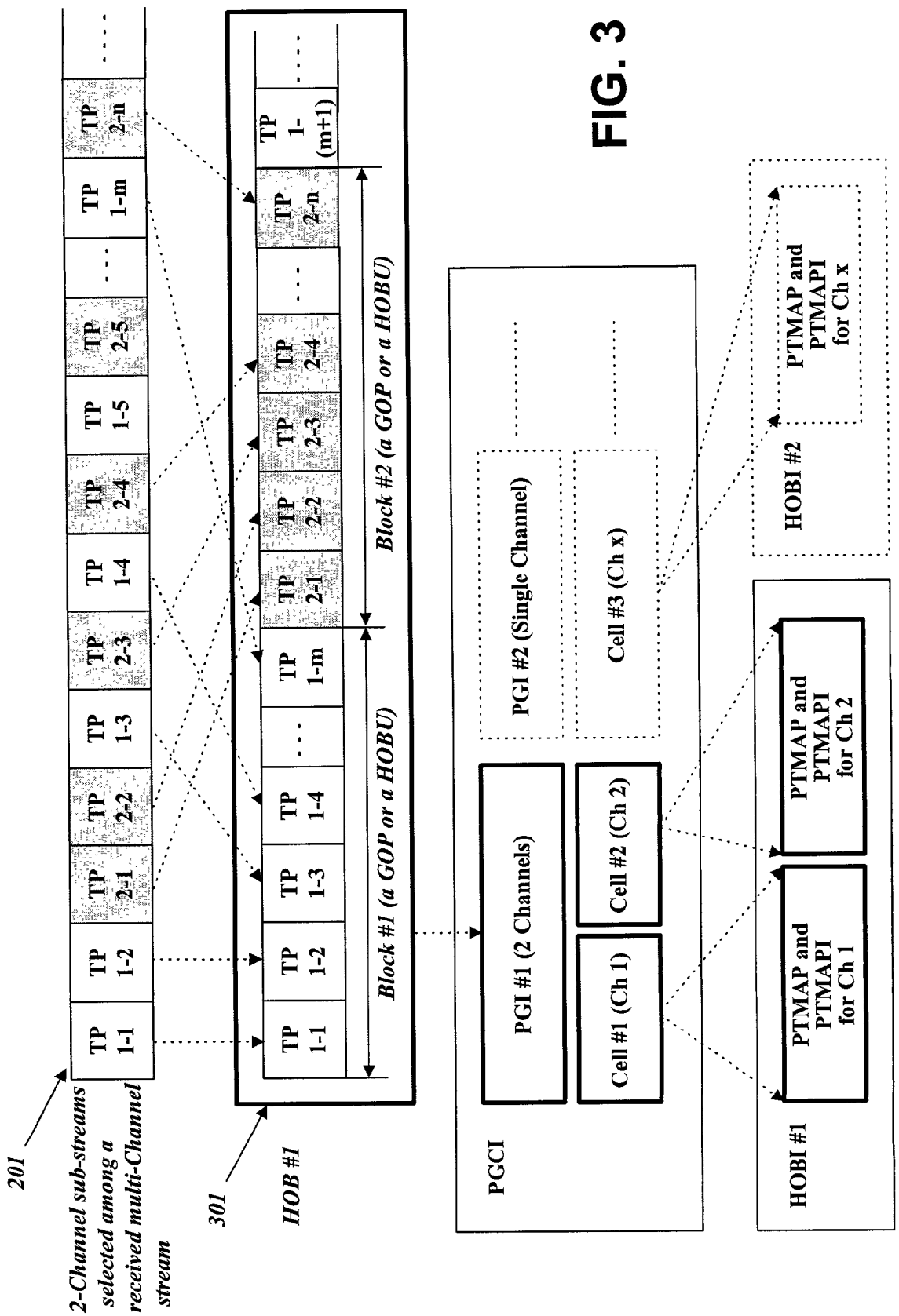
FIG. 3 illustrates the first embodiment of creating navigation data for substreams of a plurality of digital channels recorded in a single high-density stream object unit (abbreviated to 'HOB' hereinafter) in accordance with the present invention.

FIG. 3 illustrates the first embodiment of creating navigation data for substreams of a plurality of digital channels recorded in a single HOB while every some TPs are grouped for each channel in accordance with the present invention.

A recording medium for recording a digital broadcast signal has a provisional recording standard. According to the provisional recording standard, a recording medium shall have Program Chain Information (PGCI) prepared for index of every recorded program and for reproduction order among them. The PGCI includes Program Information (PGI) and Cell Information (CI) which are respectively created for each single data stream continuously recorded from recording start to stop. Furthermore, a single Presentation Time Map (PTMAP) shall be created for each single recorded data stream according to the provisional recording standard. The PTMAP, used for stream search, has collection of position data or position-related time length data for every data unit constituting a recorded data stream. Search pointer and information of each PTMAP are included in HOB information (HOBI).

However, for two substreams recorded in a single HOB while every some TPs or every TPs constituting a GOP are grouped in accordance with the first embodiment of the present invention, not single but two pieces of CI 'Cell #1 and Cell #2' and not single but two pieces of PTMAPI for two PTMAPs are created respectively, and a single piece of PGI 'PGI #1' is created, as shown in FIG. 3. Consequently, plural pieces of CI, namely, two pieces of CI are associated with single piece of PGI in this embodiment, which means that single piece of CI includes information on only one substream of a single digital channel.

The PGI and the CI are written in the PGCI while the PTMAP and the PTMAPI are in the HOBI.

In general, navigation data such as PGCI and HOBI is loaded into a memory (not figured) from the HD-DVD 100 during recording mode, and the pieces of PGI, CI and HOBI created as above are inserted in the navigation data which will be stored in a navigation data area of the HD-DVD 100 after the substreams of plural digital channels are completely recorded.

FIGS. 4 to 7 are illustrative structures of navigation data created when a multi-channel stream is recorded as shown in FIG. 3.

The PGCI of FIG. 4 includes program chain general information 'PGC_GI', plural pieces of PGI 'PGI #1 to #n', a plurality of CI search pointers 'CI_SRP #1 to #m', and plural pieces of CI 'CI #1 to #m'. Each piece of PGI includes fields of program type 'PG_TY' and the number of CI 'C_Ns'.

The program type 'PG_TY', 8-bit long, is composed of 'Protect' flag, 'S/M' flag, 3-bit number of channels 'Channel_Ns' and RF channel number 'R_CH_N' as shown in FIG. 5. The 'Protect' flag indicates whether an associated program (PG), equivalent to a conceptually-unitized stream, is erasable or not. The 'S/M' indicates whether an associated PG includes a single-channel or a multi-channel stream, and the number of channels 'Channel_Ns' describes the number of digital channels included in a recorded stream of an associated PG. The sub-field 'R_CH_N' describes RF channel number of a recorded stream of an associated PG.

For example, for the HOB #1 of FIG. 3 in which two substreams of two digital channels are recorded, '010' (=2) is written in the field 'Channel_Ns' allocated in the program type 'PG_TY' of the first piece of PGI 'PGI #1' and the 'S/M' flag allocated in the program type 'PG_TY' is set to represent multi-channel stream. Furthermore, because a piece of CI is created for each digital channel, '2' is written in the field 'C_Ns' of the first piece of PGI 'PGI #1' for the recording example of FIG. 3.

Each piece of CI is, as shown in FIG. 4, composed of five fields of cell type 'C_TY', HOBI search pointer number 'HOBI_SRPN', PTMAP number 'PTMAPN', start PTM of a cell 'C_V_S_PTM', and end PTM of a cell 'C_V_E_PTM'.

The field 'C_TY', 8-bit long, is composed of sub-fields of 2-bit cell type 'C_TY1', 3-bit channel number of a cell 'C_CH_N', and reserved as shown in FIG. 6 where the sub-field 'C_TY1' indicates whether a cell is related with multi-channel or single-channel stream, and the sub-field 'C_CH_N' describes digital channel number of a recorded substream referred by a cell.

For example, digital channel numbers of the first and the second substream are respectively written in those sub-fields 'C_CH_N' of the two pieces of CI 'CIs #1 and #2' referring to the HOB #1 of FIG. 3 in which two substreams of two digital channels are included.

Figure 7:
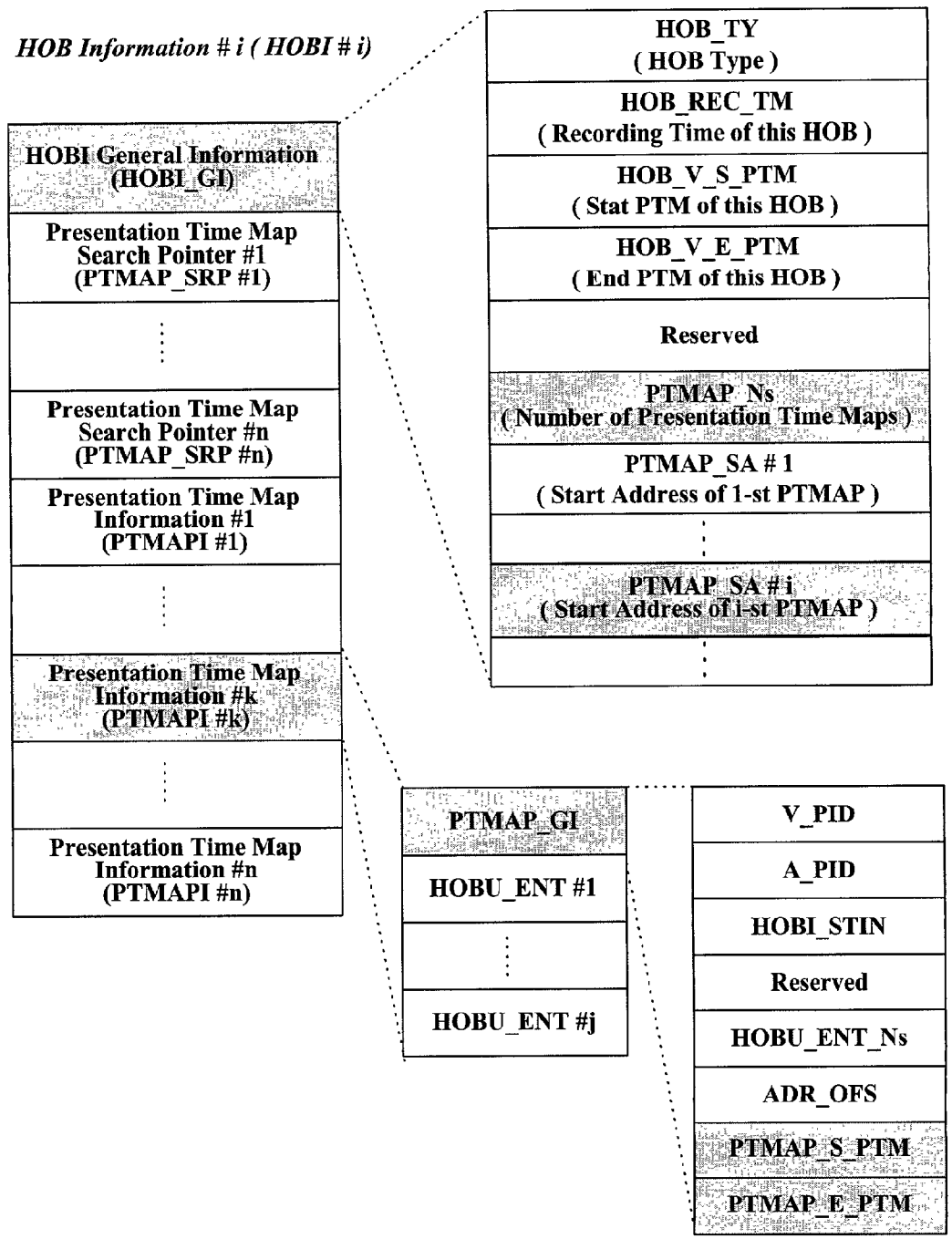

The HOBI, linked with the CI through the field 'HOBI_SRPN' included in each piece of CI, comprises HOBI general information 'HOBI_GI', a plurality of PTMAP search pointers 'PTMAP_SRP #1 to #n', and plural pieces of PTMAP information 'PTMAPI #1 to #n', as shown in FIG. 7.

The HOBI general information 'HOBI_GI' consists of many fields of HOB type 'HOB_TY', HOB recording time 'HOB_REC_TM', start PTM of a HOB, end PTM of a HOB, the number of PTMAPs 'PTMAP_Ns', and start addresses of all PTMAPs 'PTMAP_SA #i'.

The PTMAPI includes PTMAP general information 'PTMAP_GI' and entries of random accessible HOB units 'HOBU_ENT #1 to #j'. The PTMAP general information 'PTMAP_GI' is composed of fields of video 'V_PID' and audio packet ID 'A_PID', indicative of respective PIDs of audio and video TPs constituting a recorded stream associated with a PTMAP, HOBI index number 'HOBI_STIN', the number of random accessible HOB units 'HOBU_ENT_Ns', start PTM of a PTMAP 'PTMAP_S_PTM', and end PTM of a PTMAP 'PTMAP_E_PTM'.

The navigation data structured as shown in FIGS. 4 to 7 is created and recorded for a recorded multi-channel stream, as a result, when a HOB is chosen to be reproduced it can be known that the chosen HOB contains substreams of a plurality of digital channels based on the program type 'PG_TY' and the number of CI 'C_Ns' in a piece of PGI, included in the PGCI, associated with the chosen HOB.

Each digital channel number can be known from a piece of CI of which index number is equal to that of the PGI.

When searching a substream of a chosen digital channel contained in a recorded multi-channel stream in a HOB, a PTMAP associated with a substream of the chosen digital channel is determined first based on the information written in the number of PTMAPs 'PTMAP_Ns', each PTMAP start address 'PTMAP_SA #i', and start and end PTM of a PTMAP 'PTMAP_S_PTM' and 'PTMAP_E_PTM' of the PTMAP general information 'PTMAP_GI' of each piece of PTMAP information 'PTMAPI #i'. Next, a substream of the chosen digital channel is searched and then reproduced selectively among a recorded multi-channel stream using PTM incremental time and size of each data unit written in the determined PTMAP.

Figure 8:
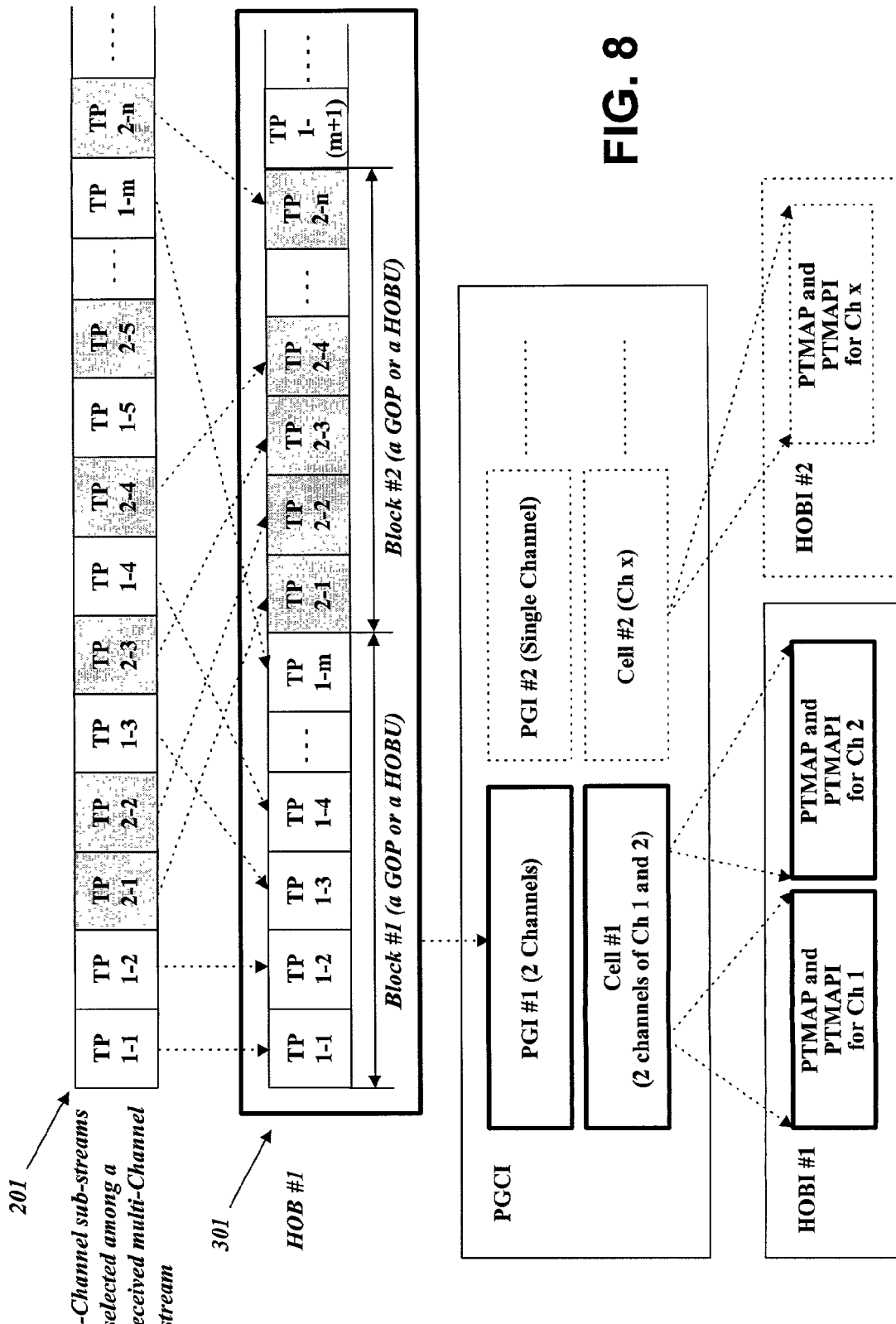
FIG. 8 illustrates the second embodiment of creating navigation data for substreams of a plurality of digital channels recorded in a single HOB in accordance with the present invention.

FIG. 8 illustrates the second embodiment of creating navigation data for substreams of a plurality of digital channels recorded in a single HOB while every some TPs are grouped for each channel in accordance with the present invention.

This second embodiment of FIG. 8 is different from the first of FIG. 3 in that a single piece of CI is created. However, the PTMAPI used for substream-distinguishable searching is created the same as the first embodiment, namely, as many pieces of PTMAPI as the number of digital channels contained in a multi-channel stream are created.

Since this second embodiment is different from the first in the number of pieces of CI created after block-interleaving record of substreams, the structure of the CI is a little changed from FIG. 4.

A piece of CI of this second embodiment includes a 'field of the number of channels' besides the fields of FIG. 4, and the field group composed of the PTMAP number 'PTMAPN', start PTM of a cell 'C_V_S_PTM', and end PTM of a cell 'C_V_E_PTM' is created as many as the number of digital channels contained in a recorded stream referred by the piece of CI. In addition, an additional field for writing digital channel numbers is reserved in the piece of CI since a single piece of CI covers all of digital channels contained in a recorded multi-channel stream. An additional field for writing digital channel numbers may be allocated in the PGI.

Since the CI has information on the number of channels of a recorded stream, the PGI need not have that information. Accordingly, in this second embodiment, the 3-bit sub-field 'Channel_Ns' of FIG. 5 allocated in the program type 'PG_TY' is removed from the PGI.

In addition, because a single piece of CI is created even though a stream of a plurality of digital channels is recorded, the field 'C_Ns' indicative of the number of pieces of CI is removed from the PGI of FIG. 4.

Even in this second embodiment, all information on every recorded substream of every digital channel is included in navigation data the same as in the first embodiment. Therefore, a substream of a selected digital channel only can be searched and reproduced among mixed multiple substreams.

Figure 9:
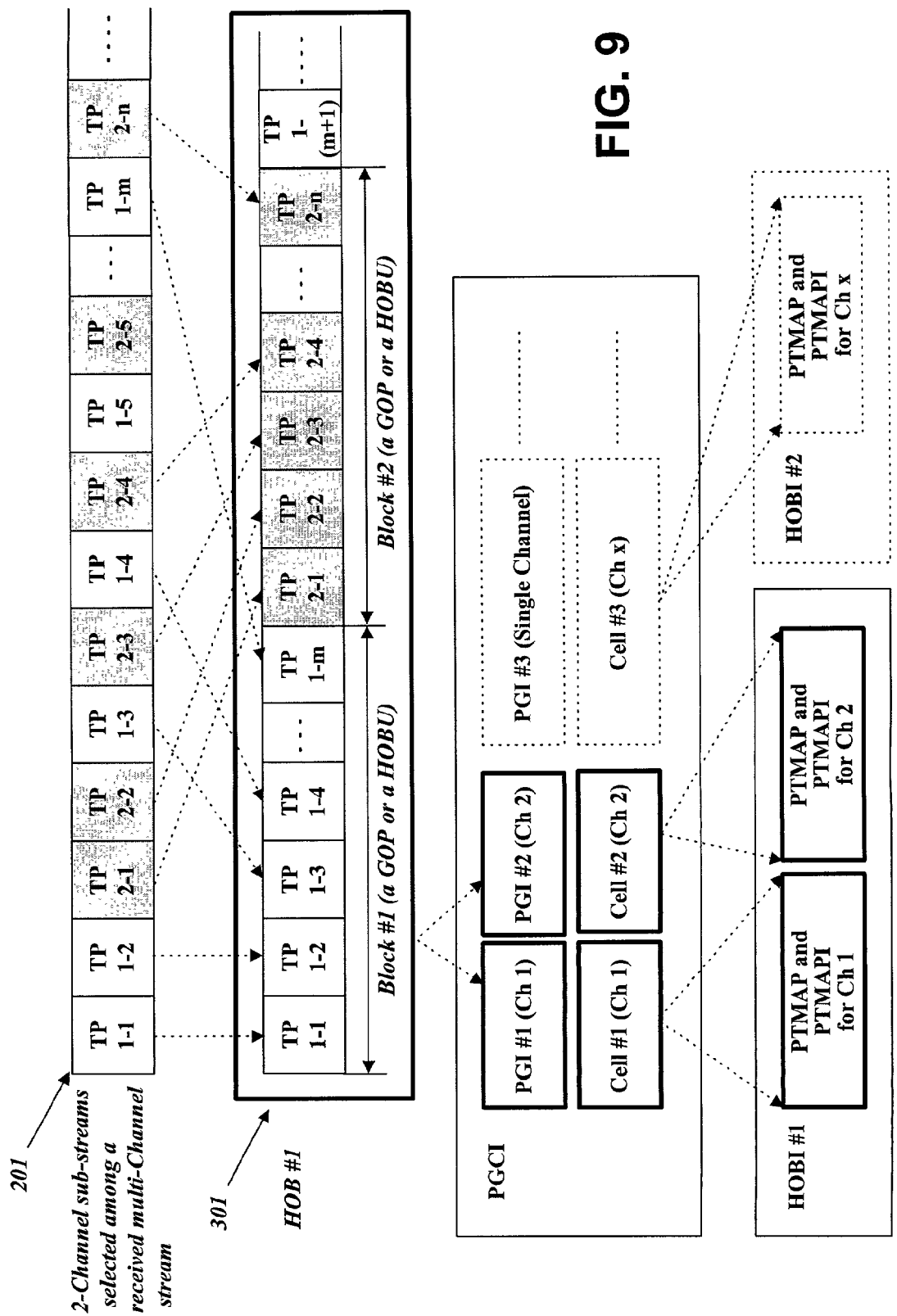
FIG. 9 illustrates the third embodiment of creating navigation data for substreams of a plurality of digital channels recorded in a single HOB in accordance with the present invention.

FIG. 9 illustrates the third embodiment of creating navigation data for substreams of a plurality of digital channels recorded in a single HOB while every some TPs are grouped for each channel in accordance with the present invention.

This third embodiment of FIG. 9 creates and records as many pieces of PGI as the number of digital channels, besides CI and PTMAPI.

Therefore, in this third embodiment, a piece of PGI covers only single substream contained in a multi-channel stream. In this case, since a piece of PGI shall accompany at least one piece of CI a piece of CI need not reserve a field for information about a plurality of digital channels. Therefore, the sub-fields of FIG. 6, namely, the cell type 'C_TY1' allocated for identifying 'multi' or 'single' stream need not be assigned in a piece of CI. Furthermore, the PTMAP number field 'PTMAPN' is removed from CI fields.

In addition, since a piece of PGI is created for each substream, piece of PGI need not manage plural channels, so that the sub-field 'Channel_Ns' allocated in the program type 'PG_TY' of FIG. 5 is not necessary. Instead, a new field for writing channel number of an associated substream shall be allocated in the PGI. If the new field is allocated in the PGI, the sub-field 'C_CH_N' in the cell type 'C_TY' can be removed from the CI associated with the PGI.

Figure 10:
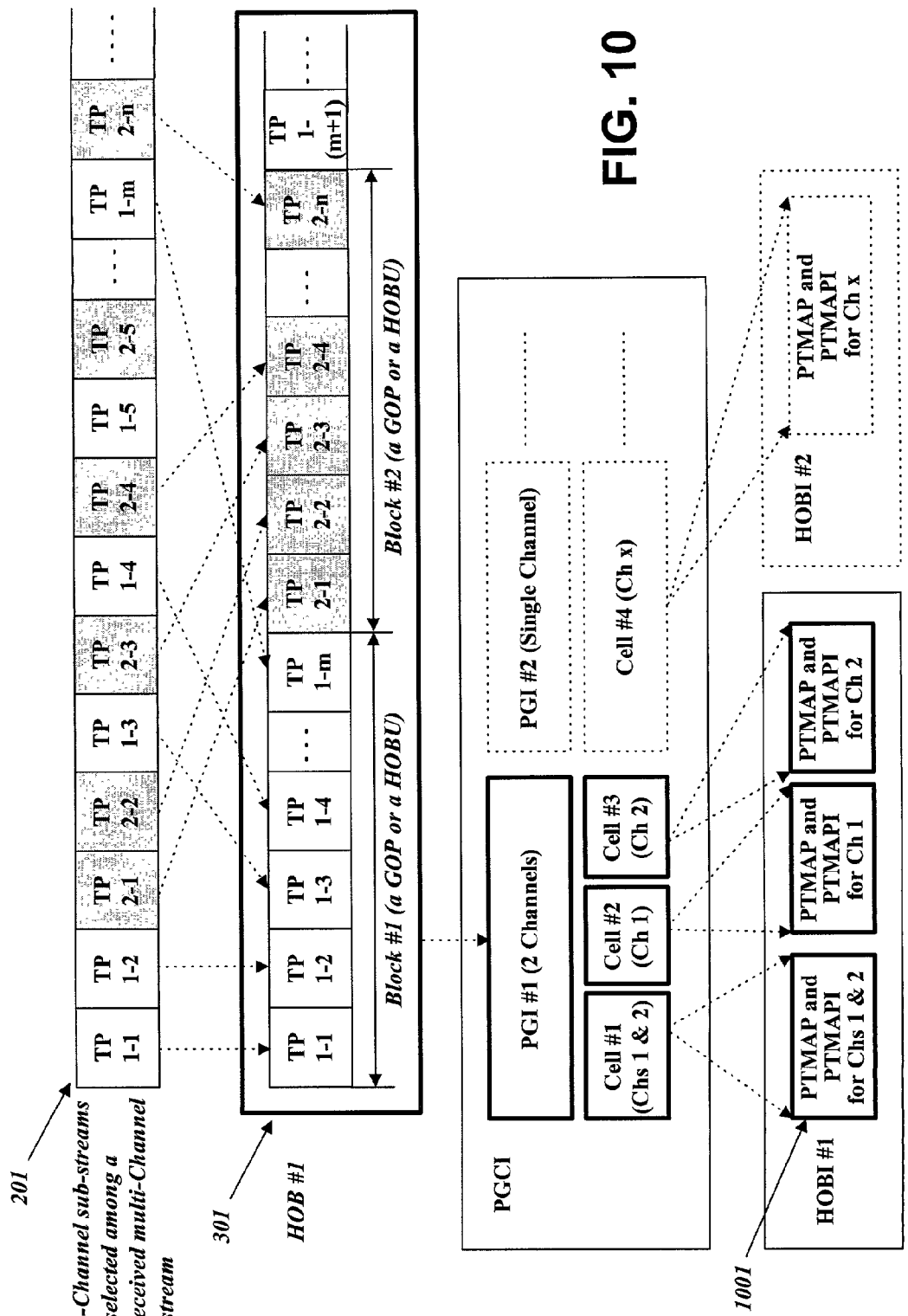
FIG. 10 illustrates the fourth embodiment of creating navigation data for substreams of a plurality of digital channels recorded in a single HOB in accordance with the present invention.

FIG. 10 illustrates the fourth embodiment of creating navigation data for substreams of a plurality of digital channels recorded in a single HOB in accordance with the present invention.

This fourth embodiment of FIG. 10 is different from the first of FIG. 3 in that PTMAPI 1001 for a multi-channel stream is further created besides respective PTMAPI for each substream.

Since there are two types of PTMAPI for a single substream and entire substreams multiplexed in a multi-channel stream it is necessary to distinguish types. Thus, an additional PTMAP type field for distinguishing types, namely, 'single' and 'mixed' shall be allocated in the PTMAP general information 'PTMAP_GI' in FIG. 7. The same as PTMAPI, the CI shall be distinguished by the type of a referred stream, namely, 'single' for a single substream and 'mixed' for entire substreams, so that an additional field for writing 'single' or 'mixed' is needed in the CI. However, instead of allocating the additional field, the cell type 'C_TY1' of FIG. 6 may be used for this type discrimination by respective new codes assigned to 'single' and 'mixed'.

The PTMAP for a multi-channel stream may not be created in stream recording. Instead, it is constructed from PTMAPs of respective substreams when it is necessary.

In this fourth embodiment of FIG. 10, three pieces of CI are created even though two substreams are recorded. As a result, for the illustrative multi-channel stream record of FIG. 10, '3' (=the number of channels +1) is written in the field 'C_Ns' of a piece of PGI and the number (=2) of actual channels is written in the sub-field 'Channel_Ns' in the program type 'PG_TY'.

In addition, special code, e.g., zero (=0), which is not used as an actual channel number, is written in the channel number sub-field 'C_CH_N' of the CI referring to a multi-channel stream. The object of using such a special code is to identify easily which navigation data is associated with an entire multi-stream in case that a channel number can not be assigned when a multi-channel stream is to be searched or reproduced not selectively but overall as it is recorded.

Figure 11:
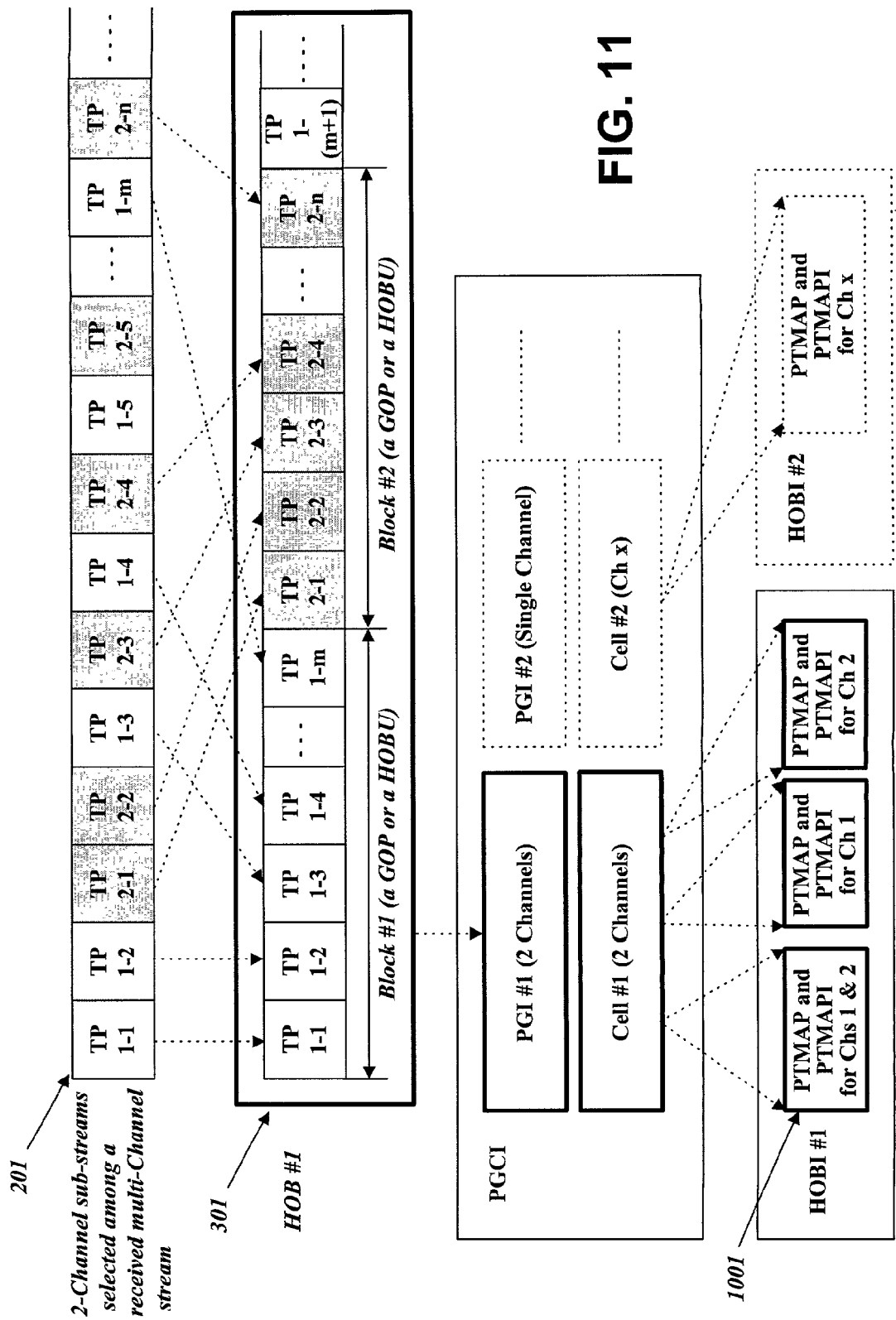
FIG. 11 illustrates the fifth embodiment of creating navigation data for substreams of a plurality of digital channels recorded in a single HOB in accordance with the present invention.

FIG. 11 illustrates the fifth embodiment of creating navigation data for substreams of a plurality of digital channels recorded in a single HOB in accordance with the present invention.

This fifth embodiment of FIG. 11 is different from the second of FIG. 8 in that PTMAPI 1001 for a multi-channel stream is further created besides respective PTMAPI for each substream.

The same as the fourth embodiment, this fifth embodiment includes an additional PTMAP type field for 'single' and 'mixed' in the PTMAP general information 'PTMAP_GI' in FIG. 7.

The PTMAP for a multi-channel stream may not be created in stream recording. Instead, it is constructed from PTMAPs of respective substreams when it is necessary.

This fifth embodiment of FIG. 11, similar to the second embodiment, has an additional field for writing the number of virtual channels, in which 'the number of actual digital channels'+1 is written, in the CI besides the fields of FIG. 4. And it has also as many field groups as the number of digital channels plus 1 in the CI. A field group is composed of the PTMAP number 'PTMAPN', start PTM of a cell 'C_V_S_PTM', and end PTM of a cell 'C_V_E_PTM'.

In addition, a new field for writing 'single' or 'mixed' is created for each field group in the CI to indicate whether a field group is related with a single or a multi-channel stream. And, another new field for writing channel number of a related substream or multi-channel stream is also allocated for each field group because a single piece of CI manages a plurality of substreams.

A special code, e.g., zero (=0) is written in the new channel number field of a field group assigned to a multi-channel stream to achieve the same object with the fourth embodiment.

Figure 12:
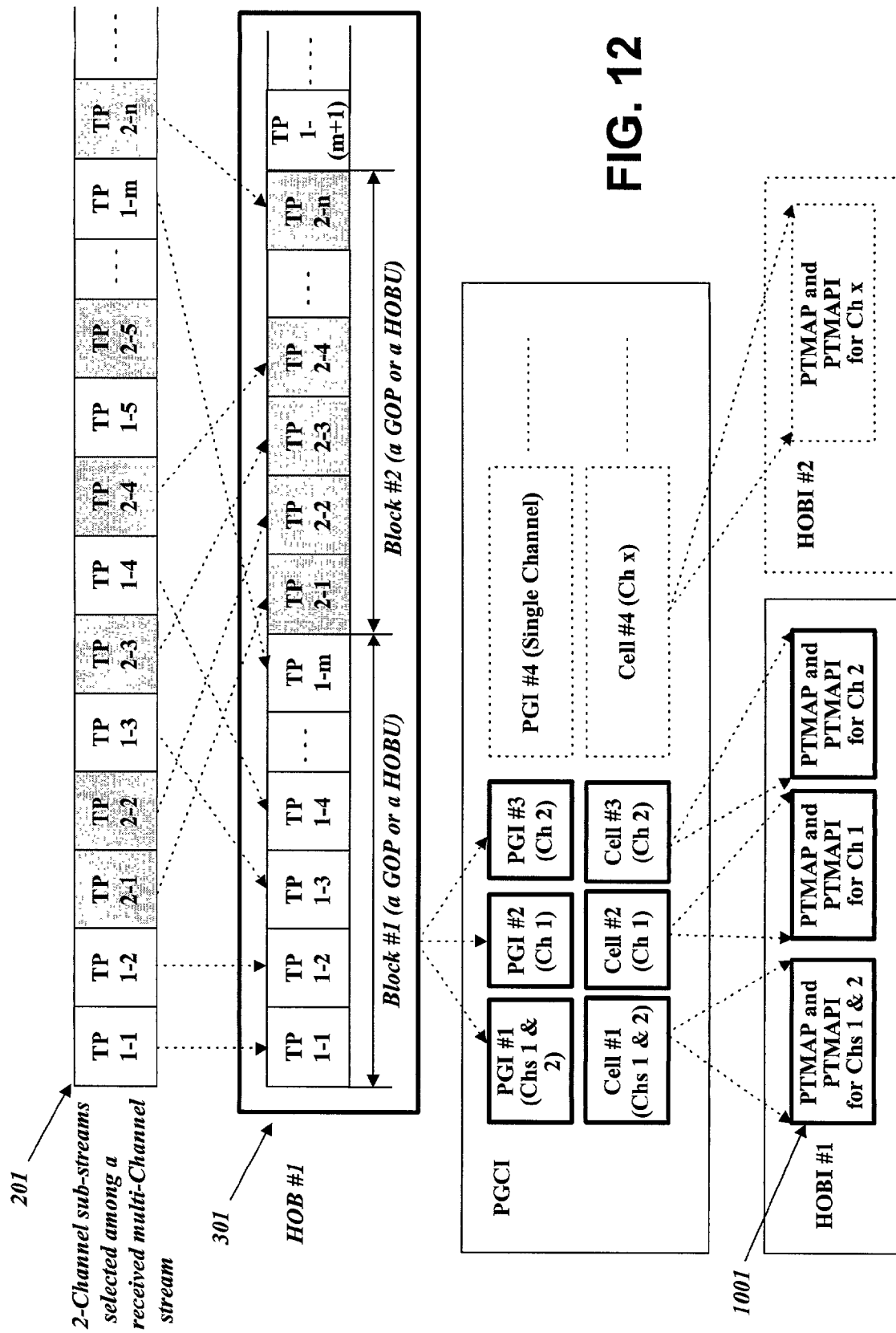
FIG. 12 illustrates the sixth embodiment of creating navigation data for substreams of a plurality of digital channels recorded in a single HOB in accordance with the present invention.

FIG. 12 illustrates the sixth embodiment of creating navigation data for substreams of a plurality of digital channels recorded in a single HOB in accordance with the present invention.

This sixth embodiment of FIG. 12 is different from the third of FIG. 9 in that PTMAPI 1001 for a multi-channel stream is further created besides respective PTMAPI for each substream.

The same as the fourth embodiment, this sixth embodiment includes an additional PTMAP type field for 'single' and 'mixed' in the PTMAP general information 'PTMAP_GI' in FIG. 7. The same as PTMAPI, the CI shall be distinguished by the type of a referred stream, namely, 'single' for a single substream and 'mixed' for entire substreams, so that an additional field for writing 'single' or 'mixed' is needed in the CI. However, instead of allocating the additional field, the cell type 'C_TY1' of FIG. 6 may be used for this type discrimination by respective new codes assigned to 'single' and 'mixed'.

Since a piece of PGI is created even for a multi-channel stream in this sixth embodiment, a piece of PGI must have an additional field for PGI type, namely, 'single' or 'mixed' or have respective codes for 'single' or 'mixed'.

The PTMAP for a multi-channel stream may not be created in stream recording. Instead, it is constructed from PTMAPs of respective substreams when it is necessary.

This sixth embodiment creates a piece of PGI for each substream the same as the third embodiment, so that the CI need not have information for a plurality of channels. Consequently, the channel number 'C_CH_N' is not necessary, and the PTMAP number 'PTMAPN' is not necessarily assigned in the CI, either.

Furthermore, since there is no need that a piece of PGI manages a plurality of channels, the sub-field 'Channel_Ns' in the program type 'PG_TY' of FIG. 5 is not necessary. Instead, an additional field for writing channel number of a related stream shall be allocated in the PGI.

A special code, e.g., '0' is written in this channel number field allocated newly in the PGI associated with a multi-channel stream.

Figure 13:
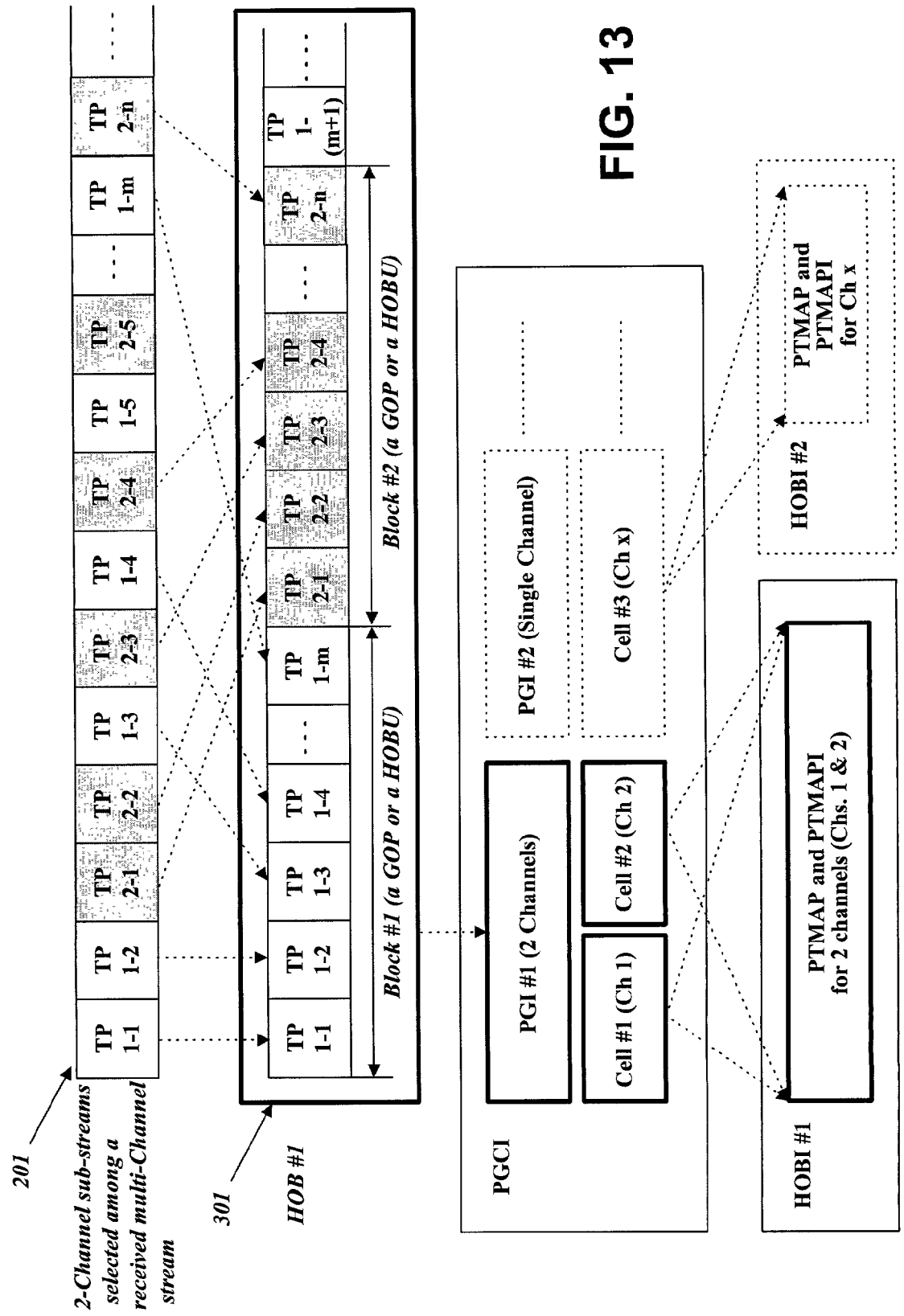
FIG. 13 illustrates the seventh embodiment of creating navigation data for substreams of a plurality of digital channels recorded in a single HOB in accordance with the present invention.

FIG. 13 illustrates the seventh embodiment of creating navigation data for substreams of a plurality of digital channels recorded in a single HOB while every some TPs or every TPs constituting a GOP are grouped for each channel in accordance with the present invention.

This seventh embodiment of FIG. 13 is different from the first of FIG. 3 in that a single piece of PTMAP and PTMAPI is created, respectively even though plural pieces of CI are created for a multi-channel stream.

Since this seventh embodiment creates a single piece of PTMAP and PTMAPI after block-interleaving record of plural substreams, each entry of the PTMAP has an additional field to indicate which channel of substream its incremental time length and size belong to. In this additional field, the channel number of a corresponding substream is written.

In addition, the PTMAPI has an additional field to identify whether an associated PTMAP includes such search information for a single or multi-channel stream.

All pieces of CI created for multiple substreams refer to the single identical PTMAP, namely, Same number is written in the field 'PTMAPN' of all pieces of CI created respectively for multiple substreams.

The above-explained multi-channel stream recording method and apparatus make it possible to selectively search and reproduce each substream among a multi-channel stream recorded on a recording medium, thereby improving use convenience of a recording machine such as a digital video recorder.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of recording a digital data stream on a recording medium, the method comprising:
    (a) recording a multi-path stream including video data of different paths, the video data including a plurality of data blocks, the data blocks of different paths being interleaved with each other; and
    (b) creating navigation information for the video data and recording the created navigation information on the recording medium,
    wherein the navigation information includes a first navigation unit, the first navigation unit including at least one second navigation unit, the second navigation unit including an identifier identifying one of the different paths of the video data having at least one entry point, the second navigation unit referencing at least two third navigation units each controlling one of the different paths, each of the third navigation units identifying at least one entry point in the video data for the one path controlled by the third navigation unit, a first of the third navigation units including position information of the at least one entry point for a first of the different paths, a second of the third navigation units including position information of the at least one entry point for a second of the different paths, the first navigation unit being separate from the third navigation units.

2. The method of claim 1, wherein the step (b) creates a single second navigation unit for the multi-path stream.

3. The method of claim 2, wherein the single second navigation unit includes a field for writing the number of a plurality of paths contained in the multi-path stream.

4. The method of claim 1, wherein the navigation information includes a type field for indicating whether an associated stream is a single-path stream or a multi-path stream.

5. The method of claim 1, wherein the number of second navigation units is equal to the number of substreams for the multi-path stream.

6. The method of claim 1, wherein a pair of first navigation units and second navigation units are created for each substream contained in the multi-path stream.

7. The method of claim 1, wherein the data block is equivalent to a random accessible GOP (Group of Picture) defined by MPEG standard.

8. The method of claim 1, wherein the multi-path stream is configured to be decoded into a plurality of paths during reproduction, each of the paths including data blocks belonging to a substream for one of the paths associated with the path.

9. An apparatus for recording a digital data stream on a recording medium, the apparatus comprising:
    a pickup configured to record data on the recording medium; and
    a controller, operably coupled to the pickup, configured to create navigation information for a multi-path stream including video data of different paths, and the controller configured to control recording the multi-path stream, the video data including a plurality of data blocks, the data blocks of different paths being interleaved with each other and the created navigation information on the recording medium,
    wherein the navigation information includes a first navigation unit, the first navigation unit including at least one second navigation unit, the second navigation unit including an identifier identifying one of the different paths of the video data having at least one entry point, the second navigation unit referencing at least two third navigation units each controlling one of the different paths, each of the third navigation units identifying at least one entry point in the video data for the one path controlled by the third navigation unit, a first of the third navigation units including position information of the at least one entry point for a first of the different paths, a second of the third navigation units including position information of the at least one entry point for a second of the different paths, the first navigation unit being separate from the third navigation units.

10. The apparatus of claim 9, wherein the controller is configured further to create a single second navigation unit for the multi-path stream.

11. The apparatus of claim 10, wherein the single second navigation unit includes a field for writing the number of a plurality of paths contained in the multi-path stream.

12. The apparatus of claim 9, wherein the controller is configured to create the navigation information including a type field for indicating whether an associated stream is a single-path stream or a multi-path stream.

13. The apparatus of claim 9, wherein the controller is configured to create as many second navigation units as the number of substreams for the multi-path stream.

14. The apparatus of claim 9, wherein the controller is configured further to create a pair of first navigation units and second navigation units for each substream contained in the multi-path stream.

15. The apparatus of claim 9, wherein the controller is configured to group every partial stream of same path to the data block, the data block is equivalent to a random accessible GOP (Group of Picture) defined by MPEG standard.

16. The apparatus of claim 9, wherein the multi-path stream is configured to be decoded into a plurality of paths during reproduction, each of the paths including data blocks belonging to a substream for one of the paths associated with the path.

17. A recording medium, comprising:
    a data area storing a multi-path stream including video data of different paths, the video data including a plurality of data blocks, data blocks of different paths being interleaved with each other; and
    a navigation area storing navigation information for the multi-path stream, wherein the navigation information includes a first navigation unit, the first navigation unit including at least one second navigation unit, the second navigation unit including an identifier identifying one of the different paths of the video data having at least one entry point, the second navigation unit referencing at least two third navigation units each controlling one of the different paths, each of the third navigation units identifying at least one entry point in the video data for the one path controlled by the third navigation unit, a first of the third navigation units including position information of the at least one entry point for a first of the different paths, a second of the third navigation units including position information of the at least one entry point for a second of the different paths, the first navigation unit being separate from the third navigation units.

18. The recording medium of claim 17, wherein the multi-path stream is configured to be decoded into a plurality of paths during reproduction, each of the paths including data blocks belonging to a substream for one of the paths associated with the path.

19. A method of reproducing data contained in a multi-path stream including video data of different paths, the video data including a plurality of data blocks, data blocks of different paths being interleaved with each other on a recording medium, the method comprising:

(a) reading navigation information from a navigation area of the recording medium, the navigation information including a first navigation unit, the first navigation unit including at least one second navigation unit, the second navigation unit including an identifier identifying one of the different paths of the video data having at least one entry point, the second navigation unit referencing at least two third navigation units each controlling one of the different paths, each of the third navigation units identifying at least one entry point in the video data for the one path controlled by the third navigation unit, a first of the third navigation units including position information of the at least one entry point for a first of the different paths, a second of the third navigation units including position information of the at least one entry point for a second of the different paths, the first navigation unit being separate from the third navigation units; and (b) reproducing each path of the multi-stream path according to the at least one second navigation unit and the third navigation units controlling the path and referenced by the at least one second navigation unit.

20. The method of claim 19, wherein the at least one second navigation unit further includes a field for writing the number of a plurality of paths contained in the multi-path stream.

21. The method of claim 19, wherein the navigation information further includes a type field for indicating whether an associated stream is a single-path stream or a multi-path stream.

22. An apparatus for reproducing data contained in a multi-path stream including video data of different paths, the video data including a plurality of data blocks, data blocks of different paths being interleaved with each other on a recording medium, the apparatus comprising:

a pickup configured to reproduce data recorded on the recording medium; and a controller, operably coupled to the pickup, configured to control reproducing navigation information from a navigation area of the recording medium, the navigation information including a first navigation unit, the first navigation unit including at least one second navigation unit, the second navigation unit including an identifier identifying one of the different paths of the video data having at least one entry point, the second navigation, unit referencing at least two third navigation units each controlling one of the different paths, each of the third navigation units identifying at least one entry point in the video data for the one path controlled by the third navigation unit, a first of the third navigation units including position information of the at least one entry point for a first of the different paths, a second of the third navigation units including position information of the at least one entry point for a second of the different paths, the first navigation unit being separate from the third navigation units, and the controller configured to control reproducing each path contained in the multi-path stream according to the at least one second navigation unit the third navigation units controlling the path and referenced by the at least one second navigation unit.

23. The apparatus of claim 22, wherein the controller is configured to reproduce the at least one single second navigation unit including a field for writing the number of a plurality of paths contained in the multi-path stream.

24. The apparatus of claim 22, wherein the controller is configured to reproduce navigation information including a type field for indicating whether an associated stream is a single-path stream or a multi-path stream.

* * * * *